US00RE38717E

(19) United States
(12) Reissued Patent
Bothwell

(10) Patent Number: US RE38,717 E
(45) **Date of Reissued Patent: *Mar. 22, 2005**

(54) GOLF CLUB

(75) Inventor: Charles R. Bothwell, Newport Beach, CA (US)

(73) Assignee: Parallel Axis Golf, Orange, CA (US)

( * ) Notice: This patent is subject to a terminal disclaimer.

(21) Appl. No.: 09/614,706

(22) Filed: Jul. 12, 2000

Related U.S. Patent Documents

Reissue of:
(64) Patent No.: 5,792,002
Issued: Aug. 11, 1998
Appl. No.: 08/725,295
Filed: Oct. 2, 1996

U.S. Applications:

(63) Continuation-in-part of application No. 08/572,637, filed on Dec. 14, 1995, now Pat. No. 5,616,087.

(51) Int. Cl.[7] ..... A63B 53/16
(52) U.S. Cl. ..... 473/316; 473/288; 473/313; 473/244
(58) Field of Search ..... 473/316, 323, 473/287, 288, 314, 298, 299, 289, 292, 294, 313; 273/81.3

(56) References Cited

U.S. PATENT DOCUMENTS

| | | | | | |
|---|---|---|---|---|---|
| 807,224 | A | | 12/1905 | Vaile | D21/219 |
| D202,504 | S | | 10/1965 | Citro | D34/5 |
| D202,715 | S | | 11/1965 | Solheim | D34/5 |
| D203,512 | S | | 1/1966 | Solheim | D34/5 |
| 3,341,203 | A | | 9/1967 | Brill | 273/81.3 |
| D216,031 | S | | 11/1969 | Blake | D21/3 |
| 3,874,668 | A | * | 4/1975 | Flege | 473/227 |
| 4,063,733 | A | | 12/1977 | Benedict | |
| 4,163,554 | A | | 8/1979 | Bernhart | |
| D256,824 | S | | 9/1980 | Ward et al. | D21/219 |
| 4,227,694 | A | * | 10/1980 | Drake | 473/255 |
| 4,265,451 | A | | 5/1981 | Bernhart | |
| 4,621,816 | A | * | 11/1986 | Leek | 473/293 |
| 4,625,965 | A | * | 12/1986 | Mullins | 473/204 |
| 4,795,153 | A | | 1/1989 | Thomas | |
| 5,308,073 | A | * | 5/1994 | McKoon et al. | 473/294 |
| 5,328,185 | A | * | 7/1994 | Finnigan et al. | 473/294 |
| 5,333,862 | A | | 8/1994 | Teramoto et al. | |
| D359,331 | S | | 6/1995 | Fenton, Jr. | D21/219 |
| 5,462,279 | A | | 10/1995 | Culpepper | |
| D364,666 | S | | 11/1995 | Nagy | D21/219 |
| 5,465,959 | A | | 11/1995 | Cheng | |
| 5,616,087 | A | * | 4/1997 | Bothwell | 473/316 |

FOREIGN PATENT DOCUMENTS

| | | | | |
|---|---|---|---|---|
| CA | 710688 | * | 6/1965 | 273/81.3 |

* cited by examiner

*Primary Examiner*—Mark S. Graham
(74) *Attorney, Agent, or Firm*—Randall L. Reed; Levin & O'Connor

(57) ABSTRACT

A golf club includes a club head and a club shaft attached to the club head. A plurality of bends which are spaced from one another are formed in the club shaft to define a straight first club shaft segment, a second club shaft segment adjoining and connected to the first club shaft segment extending upwardly from and laterally relative to the first club shaft segment, and a third club shaft segment adjoining and connected to the second club shaft segment and extending upwardly from the laterally relative to the second club shaft segment. The first club shaft segment and the third club shaft segment extend along spaced imaginary lines and the club head is closer to the golfer swinging the golf club than would be the case if the club shaft were straight along the length thereof.

20 Claims, 5 Drawing Sheets

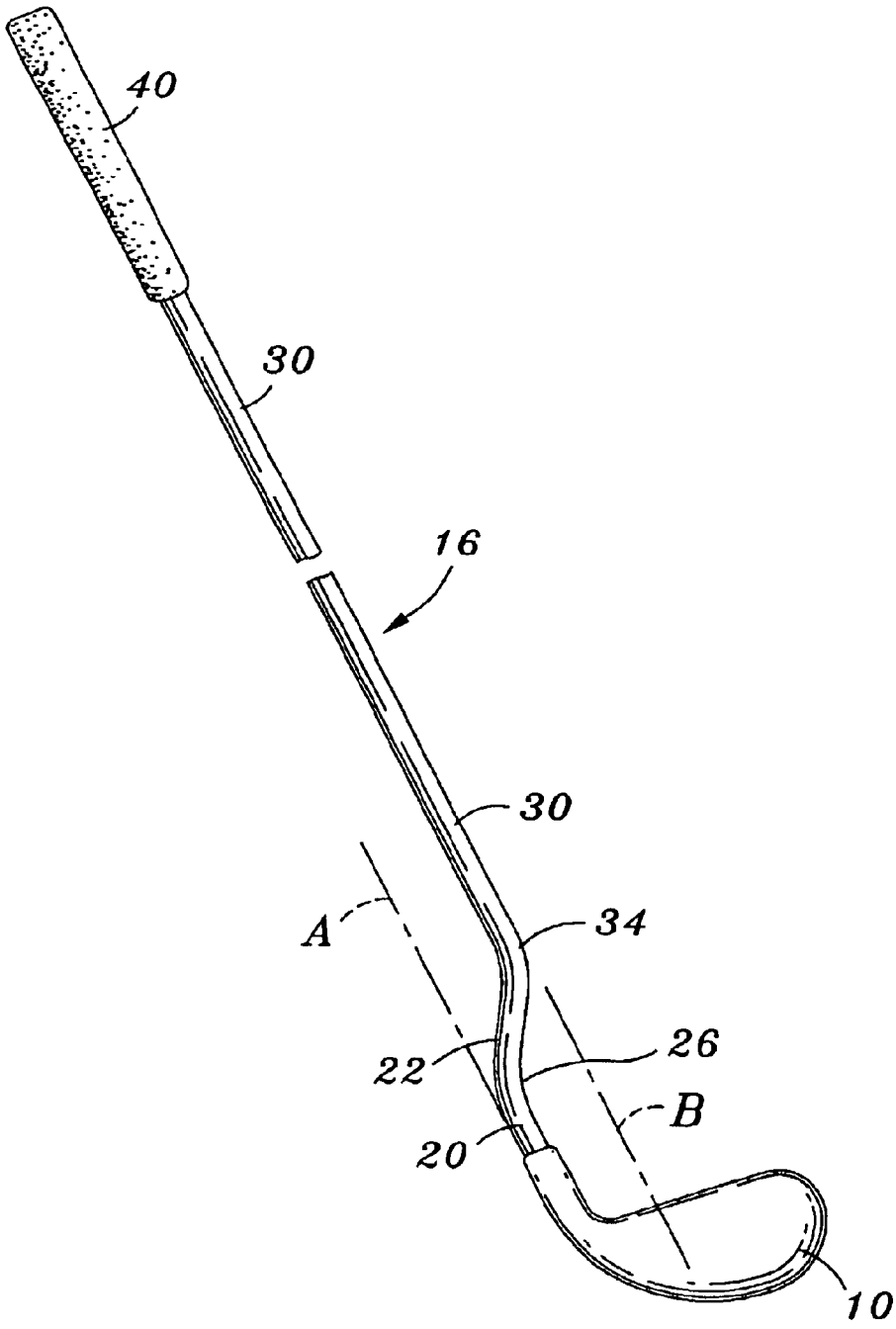
*Fig. 2A*
New

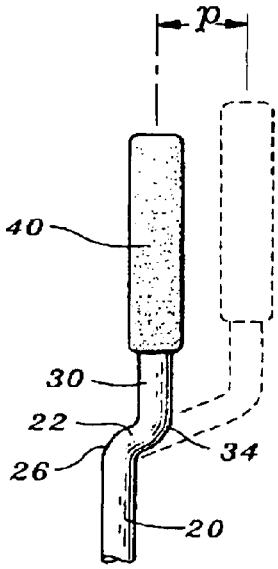
Fig. 4
Amended
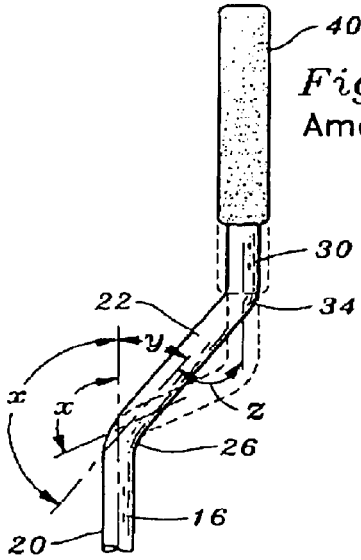
Fig. 5
Amended

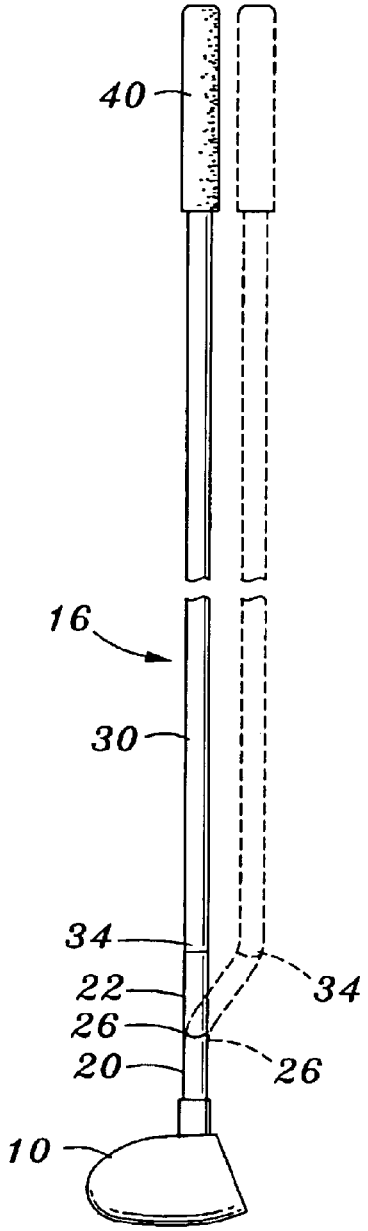
Fig. 6A
New
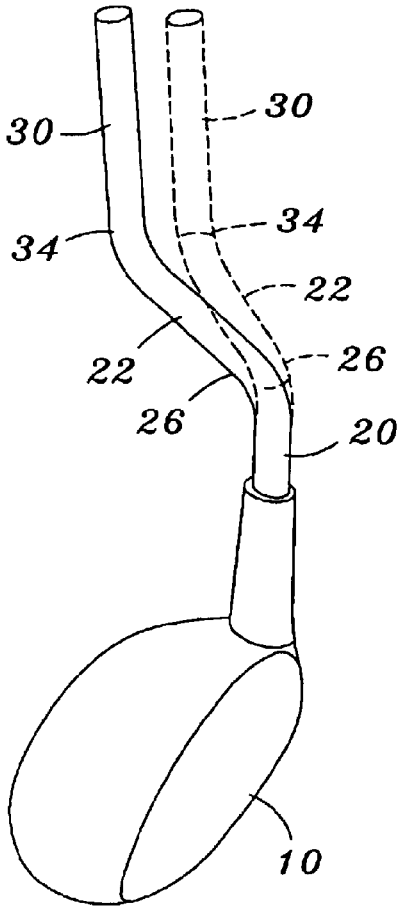
Fig. 6B
New

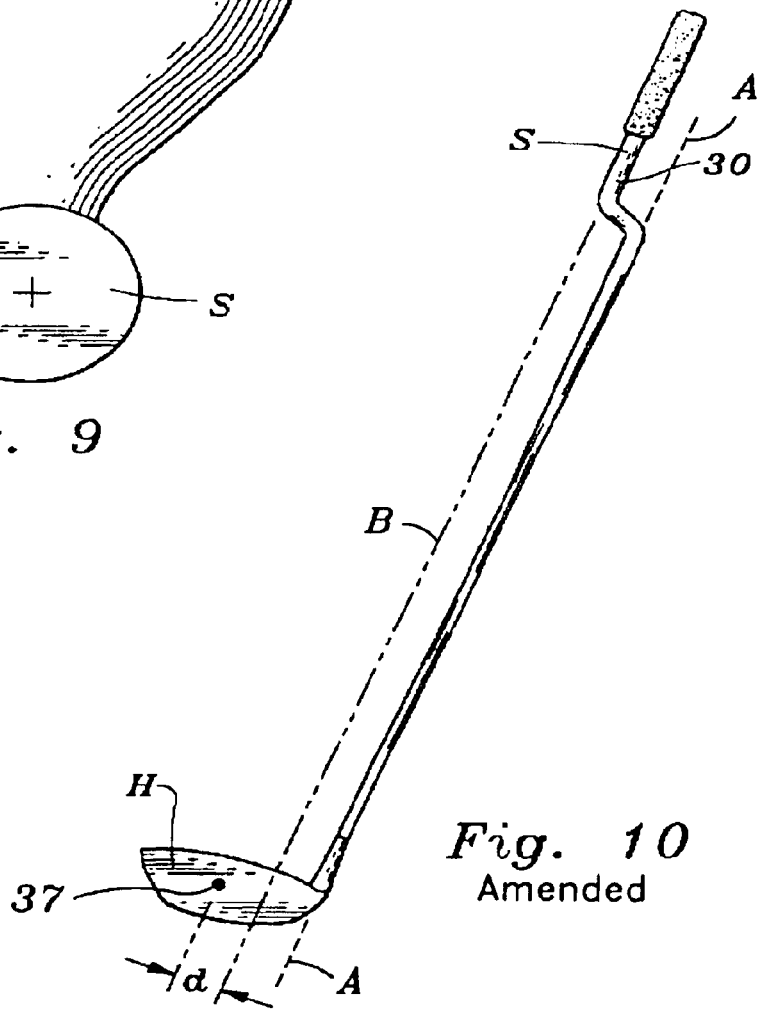
Fig. 10
Amended

GOLF CLUB

Matter enclosed in heavy brackets [ ] appears in the original patent but forms no part of this reissue specification; matter printed in italics indicates the additions made by reissue.

This Application is a continuation-in-part application based on application Ser. No. 08/572,637, filed Dec. 14, 1995, now U.S. Pat. No. 5,616,087.

TECHNICAL FIELD

This invention relates to a golf club which is so constructed as to provide improved performance compared to conventional golf club constructions. In particular, the golf club of the present invention enables a golfer to hit a golf ball longer and straighter as compared to convectional golf club constructions.

BACKGROUND ART

Golf clubs typically employ shafts which are straight between the club head and the club handle. A wide variety of materials have been and are employed in the construction of such shafts.

Golf clubs, particularly putters, have been proposed which employ shafts which are not straight in an attempt to improve club performance. The clubs shown in the following U.S. patents are believed to be representative of the state of the art insofar as non-straight club shafts are concerned: U.S. Pat. Nos. 3,874,668, issued Apr. 1, 1975, U.S. Pat. DES. 256,824, issued Sep. 9, 1980, U.S. Pat. No. 4,227,694, issued Oct. 14, 1980, U.S. Pat. No. 4,625,965, issued Dec. 2, 1986, U.S. Pat. No. 4,621,816, issued Nov. 11, 1986, U.S. Pat. No. 5,308,073, issued May 3, 1994, U.S. Pat. No. 5,328,185, issued Jul. 12, 1994 and U.S. Pat. No. 4,795,153, issued Jan. 3, 1989. The above-noted Patents all relate to golf putter constructions which allegedly improve a golfer's putting stroke. The arrangements shown in the patents appear to be inappropriate insofar as construction of golf clubs other than putters is concerned and are not directed to improvement of or performance of clubs other than putters.

Canadian Patent No. 710,688, issued Jun. 1, 1965, discloses a golf club incorporating structure that redistributes the weight of the club between the hands and the club head. The redistribution of weight is. accomplished by weighting the club intermediate the club head and hand grip, in a location selected for a particular individual, so that the club itself will tend to bring the hands toward the body during both the back swing and follow through.

An embodiment of the club disclosed in the Canadian Patent, the embodiment illustrated in the FIGS. 8 and 9 thereof, shows a form of offset and weight distribution that the inventor believed was particularly adapted for approach irons and the like. A block formed of a suitable metal such as brass, steel or aluminum, depending upon the weight required, has shaft segments located in drilled holes in the block and the structure is adjustable to place the hand grip of the club either forwardly or backwardly of the club hosel or behind the face of the club in varying amounts in accordance with the preference of the user of the golf club. FIG. 3 of the Canadian Patent discloses an embodiment in which the head of a putter is offset in the direction of the player with an offsetting portion positioned between two sections of the shaft. Lead or other weight material is poured into a drilled portion of the offset to weight the club at that location.

DISCLOSURE OF INVENTION

The present invention relates to an improved golf club construction which has been found to dramatically improve a golfer's swing and enable a golfer to hit a ball longer and straighter than with a conventional club. A golfer can "feel" the club head throughout the swing, more so than with a conventional club. This is accomplished without adding weights to the club. More particularly, the golfer club of the present invention incorporates structural elements arranged in a particular manner which cooperate to provide improved club performance without the addition of weights to the club. In fact, the principles of the present invention may be carried out merely by forming bends in a unitary club shaft, said bends being of a specific character. Utilizing this approach, no additional weight is applied to the club. Added club weight can be undesirable under many circumstances for many golfers.

In effect, a swinging golf club is a dynamic energy system, the energy input being the golfer's swing and the desired output being the transfer of energy to the ball.

During the swing, energy is inputted into the shaft when it flexes, however, virtually all of the energy is recovered when the shaft straightens, before it hits the ball, because the shaft is elastic and made from low energy loss (low hysteresis) material. In contrast, the golfer's hands are formed of a high energy loss (high hysteresis) material.

The result of this is that energy put into the hands from twist of the club is not recoverable and therefore not available to be transferred to the ball with conventional clubs.

The golf club disclosed and claimed herein, on the other hand, is of such construction that it minimizes energy loss due to twisting. This is believed to account for the improved performance of the club disclosed and claimed herein as compared to conventional clubs. The club disclosed and claimed herein not only has been found to hit a ball consistently farther but also straighter as compared to ordinary straight shafted clubs.

The golf club of the present invention includes a golf head having a substantially planar golf ball engaging surface.

A club shaft is attached to the club head and extends upwardly from the club head, the club shaft including a substantially straight first club shaft segment extending upwardly from the club head along a first imaginary line. A substantially straight second club shaft segment adjoins and is connected to the first club shaft segment at a lower bend extending upwardly from and laterally relative to the first club shaft segment from the lower bend and defining an angle with the first club shaft segment at the lower bend.

The club shaft also includes a substantially straight third club shaft segment adjoining and connected to the second club shaft segment at an upper bend spaced from the first club shaft segment and extending upwardly from and laterally relative to the second club shaft segment from the upper bend and from the second club shaft segment along a second imaginary line spaced from and substantially parallel to the first imaginary line.

The third club shaft segment and the second club shaft segment define an angle substantially equal to the angle defined by the first club shaft segment and the second club shaft segment, the angles being within the range of from about 3 degrees to about 47 degrees.

The golf club also includes an elongated club handle connected to the third club shaft segment at a location spaced from the second club shaft segment. The club handle has a distal end and is offset relative to the first club shaft segment.

The first imaginary line intersects the ground at a location to a golfer holding the golf club by the club handle and swinging the golf club to move the first club shaft segment in a swing plane substantially at right angles to the substantially planar golf ball engaging surface to strike a golf ball than the location of intersection between the second imaginary line and the ground at the time of golf ball contact by the golf ball engaging surface.

Other features, advantages, and objects of the present invention will become apparent with reference to the following description and accompanying drawings.

BRIEF DESCRIPTION OF DRAWINGS

*FIG. 2A is a side elevational view of another version of the club, a portion thereof being broken away;*

FIG. 4 is an enlarged, side elevational view illustrating the club handle and adjoining shaft portion with two alternate configurations being illustrated, one in solid line and one in dash line;

FIG. 5 is an enlarged, side elevational view of a club handle and adjoining shaft portion illustrating alternate configurations, one illustrated in solid line and one illustrated in dash line;

*FIG. 6A is a front elevational view of a club which depicts alternative alignments of the second and third sections;*

*FIG. 6B is an oblique view of the lower portion of the club depicted in FIG. 6A;*

FIG. 10 is a diagrammatic side view of a club constructed in accordance with the teachings of the present invention.

MODES FOR CARRYING OUT THE INVENTION

Figures 1, 2, 3:
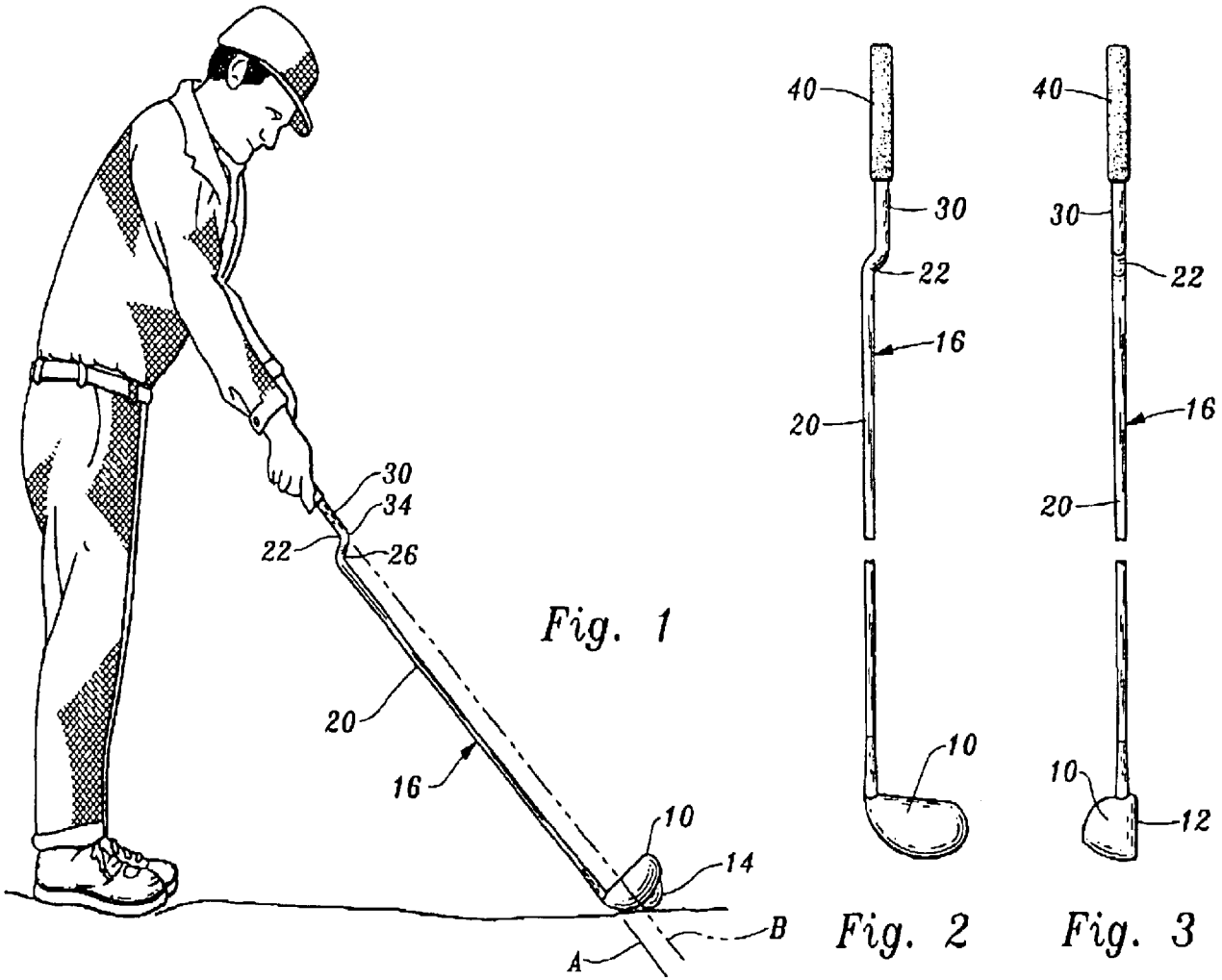
FIG. 1 is a side view showing a golfer with a golf club constructed in accordance with the teachings of the present invention.
FIG. 2 is a side elevational view of the club, a portion thereof being broken away.
FIG. 3 is a front elevational view of the club, a portion thereof being broken away.

Referring now to FIGS. 1–6, a golf club constructed in accordance with the teachings of the present invention includes a club head 10 having a substantially planar golf ball engaging surface 12 (FIG. 3). In FIG. 1 a player is shown holding the club and addressing a golf ball 14.

A club shaft 16 is attached to the club head and extends upwardly therefrom. Club shaft 16 includes a straight first club shaft segment 20 extending upwardly from the club head along a first imaginary line A.

A straight second club shaft segment 22 adjoins and is integrally connected to the first club shaft segment at a lower bend 26. The second club shaft segment extends upwardly from and laterally relative to the first club shaft segment from the lower bend and defines an angle of divergence Y (See FIG. [3] *5*) with the first club shaft segment at the lower bend.

A straight third club shaft segment 30 adjoins and is connected to the second club shaft segment at an upper bend 34 spaced from the first club shaft segment and extending upwardly from and laterally relative to the second club shaft segment from the upper bend and from the second club shaft segment.

Third club shaft segment 30 extends along a second imaginary line B. The third club shaft segment and the second club shaft segment define an angle of divergence [Y] *Z* substantially equal to angle *Y* defined by the first club shaft segment and the second club shaft segment. Unexpectedly, it has been found that the angles Y *and Z* must be within the range of from about 3 degrees to about 47 degrees in order for the club to attain the desired results of providing a longer ball distance and ball accuracy. Tests have shown that, all else being equal, a club constructed in accordance with the teachings of the present invention can hit a golf ball considerably further (and straighter) than a golf ball hit by conventional straight shaft clubs. This distance differential can run in the order of thirty feet or more in the case of drivers.

The golf club also includes an elongated club handle 40 which is connected to the third club shaft segment 30 at a location spaced from the second club shaft segment. The club handle 40 has a distal [and] *end* is offset relative to the first club shaft segment.

The first imaginary line [B] *A* intersects the ground at a location closer to a golfer holding the golf club by the club handle and swinging the golf club to move the first club shaft segment in a swing plane substantially at right angles to the substantially planar golf ball engaging surface to strike a golf ball than the location of intersection between the second imaginary line *B* and the ground at the time of golf ball contact by the golf ball engaging surface.

Controlled tests have shown that clubs constructed in accordance with the teachings of the present invention consistently hit the ball farther and straighter. Mechanical [analyses] *analysis* suggest the reason for this lies in the unique and efficient way the energy is transmitted from the golfer's hands through the club to the ball.

When the ball is struck, the force of impact produces a twisting force or torque tending to rotate the club about the axis of the grip. The amount of torque is the amount of force multiplied by a distance "d". See FIGS. [8] *9* and [9] *10* wherein "d" is the distance between the location of ball contact with club head H and the center of shaft S. This torque is resisted by the golfer's hands. However, the energy dissipated in the golfer's hands is lost from the system.

The golf club of the present invention reduces this torque by reducing the distance "d" between the point of contact with the ball and third club shaft segment 30 (and the handle). This in turn minimizes the energy dissipated, retaining more energy in the dynamic system available for conversion into ball velocity at impact. Less twist yields the secondary advantage of straighter shots as well. *As depicted in FIG. 10 the second imaginary line B projects to a position closer to the center 37 of the club head H than the first imaginary line.*

Other parameters have also been found to be important insofar as operation of the golf club in the desired manner is concerned. The length of the second club shaft segment 22 between upper bend 34 and lower bend [36] *26* should be in the range of from about ¼ inch to about 5 inches. FIG. 4 indicates this dimension by reference letter [Y] *P* and the figure also illustrates a second golf club shaft segment of a shorter length in solid lines and the same segment in longer length by dash lines.

Another golf club construction parameter of importance is that the distance between the distal [and] *end* of the club handle and the upper bend 34 is to be within the range of from about 7 inches to about 37 inches. *FIG. 2A depicts a golf club with the upper bend 34 at or near 37 inches from the distal end of the handle.*

Figure 6:
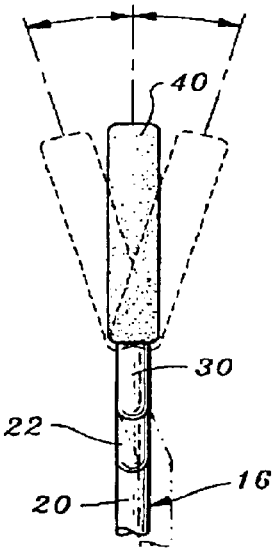
FIG. 6 is a front elevational view of the club handle and [adjacement] *adjacent* club shaft portion illustrating alternate canted handle configurations.

The handle 40 may be inclined relative to the first club shaft segment as illustrated by the dash line representations of the handle in FIG. 6. For purposes of practicing the present invention, the angle of inclination with the first club shaft segment should be no more than about 5 degrees.

The first and third club shaft segments of the club shown in FIG. 3 are aligned in a plane orthogonal to the swing plane. This is also shown in FIG. 6 in the solid line representation of the club. However, it is within the scope of the present invention to incline the second club shaft segment at an offset angle whereby the first and third club shaft segments are offset by the second club shaft segment and are not aligned in a plane orthogonal to the swing plane. This is shown by the dash line representation of the second club shaft segment 22 and first club shaft segment 20 in FIG. 6 wherein the first club shaft segment is offset to the right relative to third club shaft segment 30. Of course, the offset could be to the left *as depicted in FIG. 6A* depending upon the desires and requirements of the player. In any event, the offset angle [is to] *can* be within the range of from about 1 degree to about 5 degrees *or more. The offset angle would obviously be zero degrees when the first and third shaft segments are aligned in the plane perpendicular to the swing plane of the golf club as depicted in FIG. 3 and the solid line portions of FIGS. 6 and 6A.*

The golf club shown in FIGS. 1–6 has a shaft which is of integral, single piece construction and which is bent at two spaced locations to form the upper and lower bends as well as the second club shaft segment.

Figure 7:
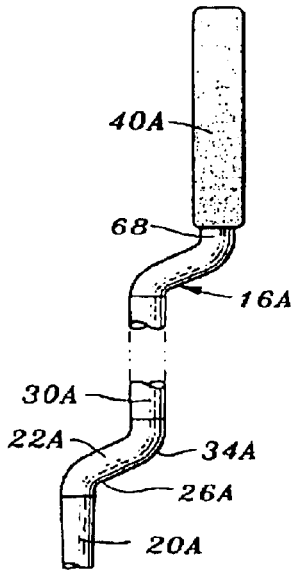
FIG. 7 is an enlarged, side elevational view of a club handle and adjoining club shaft portion of an alternate embodiment of the club.
Figure 8:
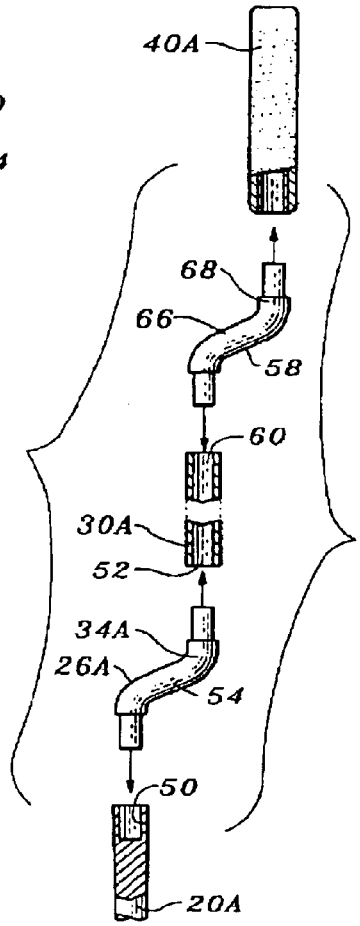
FIG. 8 is an exploded view showing selected structural elements of the alternate embodiment.
Figure 9:
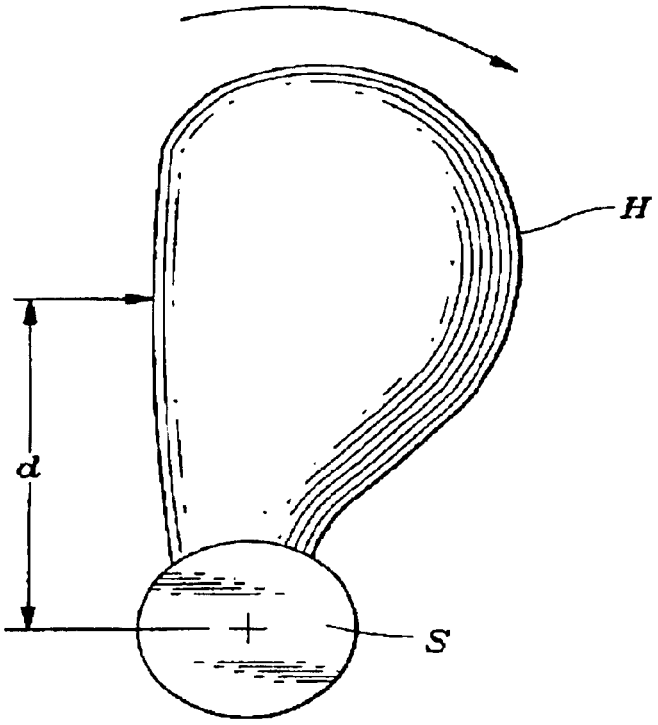
FIG. 9 is a diagrammatic top plan view of a club head and shaft.

FIGS. 7 and 8 illustrate an alternative embodiment of the invention. In this instance, the club shaft 16A is of nonintegral, multi-piece construction. In this embodiment, first club shaft segment 20A has a socket 50 and third club shaft segment 30A defines a socket 52. Sockets 50, 52 receive opposed reduced ends of an insert 54 having bends 26A and 34A formed therein. Any suitable means may be employed to secure the insert 54 to the first and third of shaft segments.

The embodiments of FIGS. 7 and 8 also differs from that previously described by virtue of the fact that a second insert 58 is connected to handle 40A and a socket 60 formed at the upper end of third club shaft segment 30A.

Insert 58 forms a fourth club shaft segment 66 which is connected to the third club shaft segment and extends upwardly and laterally relative thereto. The insert also forms a fifth club shaft segment 68 which is connected to and extends upwardly from the fourth cub shaft segment along a second imaginary line spaced from the first imaginary line occupied by first club shaft segment 20A.

The elongated club handle 40A is connected to the fifth club shaft segment. The club handle is offset relative to the first club shaft segment 20A. Thus, the first imaginary line occupied by club shaft segment 20A will intersect the ground at a location closer to a golfer holding the golf club by the club handle and swinging the golf club to strike a golf ball than the location of intersection between the second imaginary line occupied by the fifth club shaft segment and the ground at the time of golf ball contact by the golf ball engaging surface.

I claim:

1. A golf club comprising, in combination:

a club head having a golf ball engaging surface;

a club shaft attached to said club head and extending upwardly from said club head, said club shaft including a substantially straight first club shaft segment extending upwardly from said club head along a first imaginary line, a second club shaft segment adjoining and connected to said first club shaft segment and extending upwardly and laterally relative to said first club shaft segment, a substantially straight third club shaft segment adjoining and connected to said second club shaft segment at a location spaced from said first club shaft segment and extending upwardly from said second club shaft segment, a fourth club shaft segment connected to said third club shaft segment and extending upwardly and laterally relative to said third club shaft segment, and a substantially straight fifth club shaft segment connected to and extending upwardly from said fourth club shaft segment along a second imaginary line spaced d from said first imaginary line; and an elongated club handle connected to said fifth club shaft segment, said club handle being offset relative to said first club shaft segment, and said first imaginary line intersecting the ground at a location closer to a golfer holding the golf club by said club handle and swinging the golf club to strike a golf ball than the location of intersection between said second imaginary line and the ground at the time of golf ball contact by said golf ball engaging surface.

2. The golf club according to claim 1 wherein said club shaft is of non-integral, multi-piece construction and wherein at least one of said second and fourth club shaft segments comprises an insert connected to the remainder of said club shaft.

3. A golf club comprising, in combination:

a club head having a substantially planar golf ball engaging surface;

a club shaft attached to said club head and extending upwardly from said club head, said club shaft including a substantially straight first club shaft segment extending upwardly from said club head along a first imaginary line, a substantially straight second club shaft segment adjoining and connected to said first club shaft segment at a lower bend extending upwardly from and laterally relative to said first club shaft segment from said lower bend and defining an angle of divergence with said first club shaft segment at said lower bend, and a substantially straight third club shaft segment adjoining and connected to said second club shaft segment at an upper bend spaced from said first club shaft segment and extending upwardly from and laterally relative to said second club shaft segment from said upper bend and from said second club shaft segment along second imaginary line spaced from and substantially parallel said first imaginary line, said third club shaft segment and said second club shaft segment defining an angle of divergence substantially equal to the angle of divergence defined by said first club shaft segment and said second club shaft segment, said angles being within the range of from about 3 degrees to about 47 degrees; and an elongated club handle connected to said third club shaft segment at a location spaced from said second club shaft segment, said club handle having a distal end and being offset relative to said first club shaft segment, and said first imaginary line intersecting the ground at a location closer to a golfer holding the golf club by said club handle and swinging the golf club to move said first club shaft segment in a swing plane substantially at right angles to said substantially planar golf ball engaging surface to strike a golf ball than the location of intersection between said second imaginary line and the ground at the time of golf ball contact by said golf ball engaging surface, said handle inclined relative to said first club shaft segment and defining an angle of inclination with said first club shaft segment of no more than about five degrees.

4. A golf club comprising, in combination:

a club head having a substantially planar golf ball engaging surface;

a club shaft attached to said club head and extending upwardly from said club head, said club shaft including a substantially straight first club shaft segment extending upwardly from said club head along a first imaginary line, a substantially straight second club shaft segment adjoining and connected to said first club shaft segment at a lower bend extending upwardly from and laterally relative to said first club shaft segment from said lower bend and defining an angle of divergence with said first club shaft segment at said lower bend, and a substantially straight third club shaft segment adjoining and connected to said second club shaft segment at an upper bend spaced from said first club shaft segment and extending upwardly from and laterally relative to said second club shaft segment from said upper bend and from said second club shaft segment along second imaginary line spaced from and substantially parallel said first imaginary line, said third club shaft segment and said second club shaft segment defining an angle of divergence substantially equal to the angle of divergence defined by said first club shaft segment and said second club shaft segment, said angles being within the range of from about 3 degrees to about 47 degrees; and an elongated club handle connected to said third club shaft segment at a location spaced from said second club shaft segment, said club handle having a distal end [and being offset relative to said first club shaft segment], and said first imaginary line intersecting the ground at a location closer to a golfer holding the golf club by said club handle and swinging the golf club to move said first club shaft segment in a swing plane substantially at right angles to said substantially planar golf ball engaging surface to strike a golf ball than the location of intersection between said second imaginary line and the ground at the time of golf ball contact by said golf ball engaging surface, said second club shaft segment inclined at an offset angle whereby said first and third club shaft segments are offset by said second club shaft segment and are not aligned in a plane orthogonal to said swing plate.

5. The golf club according to claim 4 wherein said offset angle is within the range of from about one degree to about five degrees.

*6. A golf club comprising, in combination:*

*a club head having a substantially planar golf ball engaging surface;*

*a club shaft attached to said club head and extending upwardly from said club head, said club shaft including a substantially straight first club shaft segment extending upwardly from said club head along a first imaginary line, a substantially straight second club shaft segment during adjoining and connected to said first club shaft segment at a lower bend extending upwardly from and laterally relative to said first club shaft segment from said lower bend and defining an angle of divergence with said first club shaft segment at said lower bend, and a substantially straight third club shaft segment adjoining and connected to said second club shaft segment at an upper bend spaced from said first club shaft segment and extending upwardly from and laterally relative to said second club shaft segment from said upper bend and from said second club shaft segment along a second imaginary line spaced from and substantially parallel said first imaginary line, said third club shaft segment and said second club shaft segment defining an angle of divergence substantially equal to the angle of divergence defined by said first club shaft segment and said second club shaft segment, said angles being within the range of from about 3 degrees to about 47 degrees and wherein the length of said second shaft segment between said lower and upper bends being in the range of from about one quarter inch to about five inches; and*

*an elongated club handle connected to said third club shaft segment at a location spaced from said second club shaft segment, said club handle having a distal end, and said first imaginary line intersecting the ground at a location closer to a golfer holding the golf club by said club handle and swinging the golf club to move said first club shaft segment in a swing plane substantially at right angles to said substantially planar golf ball engaging surface to strike a golf ball than the location of intersection between said second imagi-*

*nary line and the ground at the time of golf ball contact by said golf ball engaging surface, said handle, said first club shaft segment, said second club shaft segment and said third club shaft segment form a plane that is not aligned in a plane orthogonal to the swing plane of the golf club.*

*7. A golf club comprising:*

*a golf club head with a substantially planar golf ball engaging surface;*

*a golf club shaft with:*

*a first shaft segment attached to and extending up from said golf club head along a first imaginary line, to a first bend;*

*a second shaft segment extending off at said first bend from said first shaft segment at a first predetermined angle of divergence to a second bend;*

*a third shaft segment extending along a second imaginary line, off at said second bend from said second shaft segment at a second predefined angle of divergence;*

*wherein said first and second predefined angles of divergence vary from 3 degrees to about 47 degrees;*

*wherein said first imaginary line of said first shaft segment is parallel to said second imaginary line of said third shaft segment and said golf club shaft is positioned with respect to said golf club head such that an extension of said second imaginary line towards said golf club head projects to a position closer to a center of said golf club head than a projection of said first imaginary line towards said golf club head;*

*wherein said first and second predefined angles are equal and said second section is positioned at a predetermined offset angle with respect to said first and third shaft segments;*

*said offset angle at which said second shaft segment is inclined positions said first, second and third segments such that a plane formed by said first, second and third shaft segments is not aligned in a plane orthogonal to a swing plane of said golf club.*

*8. The golf club of claim 7 further comprising, a handle extending off of said third shaft segment on an end of said third shaft segment which end is opposite a position of where said second shaft segment connects to said third shaft segment.*

*9. The golf club of claim 7 wherein said angle of offset is within a range from about one degree to about five degrees or more.*

*10. The golf club of claim 8 wherein said first bend is located from about 7 to about 37 inches from a distal end of said handle.*

*11. The golf club of claim 7 wherein said shaft is an integral single piece construction bent in two spaced locations to form said first, second and third shaft segments.*

*12. A golf club comprising:*

*a golf club head with a substantially planar golf ball engaging surface;*

*a golf club shaft with:*

*a first shaft segment attached to and extending up from said golf club head along a first imaginary line, to a first bend;*

*a second shaft segment extending off at said first bend from said first shaft segment at a first predetermined angle of divergence, to a second bend;*

*a third shaft segment extending, along a second imaginary line, off at said second bend from said second shaft segment at a second predefined angle of divergence;*

*wherein said first and second predefined angles of divergence vary from 3 degrees to about 47 degrees;*

*wherein said first imaginary line of said first shaft segment is parallel to said second imaginary line of said third shaft segment and said shaft is positioned with respect to said golf club head such that an extension of said first imaginary line towards said golf club head projects it to a position on a ground closer to a golfer standing on that ground and holding said golf club than a position on the ground of a projection of said second imaginary line towards the golf club head;*

*wherein said second shaft segment is positioned at a predetermined offset angle with respect to said first and second shaft segments; and*

*wherein said offset angle at which said second shaft segment is inclined positions said first and third shaft segments such that a plane formed by said first and said third shaft segments is not aligned in a place orthogonal to a swing plane of said golf club which swing plane is orthogonal to said substantially planar golf ball engaging surface.*

*13. The golf club of claim 12 further comprising a handle extending off of said third shaft segment on an end of said third shaft segment which end is opposite a position of where said second shaft segment connects to aid third shaft segment.*

*14. The golf club of claim 12 wherein said angle of offset is within a range from about one degree to about five degrees or more.*

*15. The golf club of claim 13 wherein said first bend is located from about 7 to about 37 inches from a distal end of said handle.*

*16. The golf club of claim 12 wherein said shaft is an integral single piece construction bent in two spaced locations to form said first, second and third shaft segments.*

*17. A golf club comprising:*

*a golf cub head with a substantially planar golf ball engaging surface;*

*a golf club shaft with:*

*a first segment attached to and extending up from said golf club head along a first imaginary line, to a first bend;*

*a second shaft segment extending off at said first bend from said first shaft segment at a first predetermined angle of divergence, to a second bend;*

*a third shaft segment extending, along a second imaginary line, off at said second bend from said second shaft segment at a second predefined angle of divergence; and*

*wherein said first and second predefined angles of divergence vary from 3 degrees to about 47 degrees;*

*wherein said shaft is an integral single piece construction bent in two spaced locations to form said first, second and third shaft segments;*

*wherein said first imaginary line of said first shaft segment is parallel to said second imaginary line of said third shaft segment and said shaft is positioned with respect to said golf club head such that an extension of said first imaginary line towards said golf club head projects it to a position on a ground closer to a golfer standing on that ground and holding said golf club than a position on the ground of a projection of said second imaginary line towards the golf club head;*

*wherein said second shaft segment is positioned at a predetermined offset angle with respect to said first and second shaft segments; and*

*wherein said offset angle at which said second shaft segment is inclined positions said first and third shaft segments such that a plane formed by said first and said third shaft segment is not aligned in a plane orthogonal to a swing plane of said golf club which swing plane is orthogonal to said substantially planar golf ball engaging surface.*

*18. The golf club of claim 17 further comprising a handle extending off of said third shaft segment on an end of said third shaft segment which end is opposite a position where said second shaft segment connects to said third shaft segment.*

*19. The golf club of claim 17 wherein said angle of offset is within a range from about one degree to about five degrees or more.*

*20. The golf club of claim 17 wherein said first bend is located from about 7 to about 37 inches from a distal end of said handle.*

* * * * *